(12) United States Patent
Long et al.

(10) Patent No.: US 11,318,537 B2
(45) Date of Patent: May 3, 2022

(54) MICROWAVE SENSING IN ADDITIVE MANUFACTURING

(71) Applicant: HEWLETT-PACKARD DEVELOPMENT COMPANY, L.P., Houston, TX (US)

(72) Inventors: Greg Scott Long, Corvallis, OR (US); Douglas Pederson, Corvallis, OR (US); David A. Champion, Corvallis, OR (US)

(73) Assignee: Hewlett-Packard Development Company, L.P., Spring, TX (US)

(*) Notice: Subject to any disclaimer, the term of this patent is extended or adjusted under 35 U.S.C. 154(b) by 926 days.

(21) Appl. No.: 16/074,457

(22) PCT Filed: Jan. 31, 2017

(86) PCT No.: PCT/US2017/015848
§ 371 (c)(1),
(2) Date: Aug. 1, 2018

(87) PCT Pub. No.: WO2018/143948
PCT Pub. Date: Aug. 9, 2018

(65) Prior Publication Data
US 2021/0205894 A1 Jul. 8, 2021

(51) Int. Cl.
*B22F 12/90* (2021.01)
*B33Y 10/00* (2015.01)
(Continued)

(52) U.S. Cl.
CPC .............. *B22F 12/90* (2021.01); *B22F 10/85* (2021.01); *B33Y 10/00* (2014.12); *B33Y 30/00* (2014.12);
(Continued)

(58) Field of Classification Search
CPC .......... B22F 12/90; B22F 10/85; B22F 10/28; B33Y 50/02; B33Y 10/00; B33Y 30/00; G01N 22/02
See application file for complete search history.

(56) References Cited

U.S. PATENT DOCUMENTS

| 5,648,038 A | 7/1997 | Fathi et al. |
| 2009/0206065 A1 | 8/2009 | Kruth et al. |

(Continued)

FOREIGN PATENT DOCUMENTS

| EP | 1700686 A2 | 9/2006 |
| WO | 03026876 A2 | 4/2003 |

(Continued)

OTHER PUBLICATIONS

Waggoner et al., The relationship between material properties, device design, and the sensitivity of resonant mechanical sensors, : J. Appl. Phys. 105, 054306 (2009) (Year: 2009).*

(Continued)

*Primary Examiner* — Rebecca Janssen
(74) *Attorney, Agent, or Firm* — HP Inc. Patent Department

(57) ABSTRACT

A system and method for additive manufacturing (AM) including forming a product via AM, placing a resonator adjacent the product as the product is being formed in the AM, and determining a property of the product. The resonator operates over a microwave frequency spectrum and emanates electromagnetic energy.

15 Claims, 10 Drawing Sheets

(51) Int. Cl.
    *B33Y 30/00*     (2015.01)
    *B33Y 50/02*     (2015.01)
    *G01N 22/02*     (2006.01)
    *B22F 10/28*     (2021.01)
    *B22F 10/85*     (2021.01)

(52) U.S. Cl.
    CPC .............. *B33Y 50/02* (2014.12); *G01N 22/02* (2013.01); *B22F 10/28* (2021.01)

(56) References Cited

U.S. PATENT DOCUMENTS

| | | |
|---|---|---|
| 2014/0163717 A1 | 6/2014 | Das et al. |
| 2015/0122577 A1 | 5/2015 | Zalewski et al. |
| 2015/0168314 A1 | 6/2015 | El Matbouly et al. |
| 2017/0239719 A1* | 8/2017 | Buller .................. B23K 26/032 |

FOREIGN PATENT DOCUMENTS

| | | |
|---|---|---|
| WO | 2016094827 A1 | 6/2016 |
| WO | 2016146374 A1 | 9/2016 |

OTHER PUBLICATIONS

"Real-Time Monitoring and Control of Additive Manufacturing Processes", NIST, Retrieved from Internet: https://www.nist.gov/programs-projects/real-time-control-additive-manufacturing-processes, 2017, 3 pages.

* cited by examiner

200

300

400

810

MICROWAVE SENSING IN ADDITIVE MANUFACTURING

BACKGROUND

Additive manufacturing (AM) may include three-dimensional (3D) printing and generate 3D objects. In some AM processes, successive layers of material are formed under computer control to fabricate the object. The material may be metal, powder, plastic, concrete, composite material, and other materials. The objects can be various shapes and geometries, and produced via a model such as a 3D model or other electronic data source. The fabrication may involve laser melting, laser sintering, fused deposition, and so on. The model and automated control may facilitate the layered manufacturing and additive fabrication. As for applications, AM may fabricate intermediate and end-use products for aerospace (e.g., aircraft), machine parts, medical devices (e.g., Implants), automobile parts, fashion products, structural and conductive metals, ceramics, conductive adhesives, semiconductor devices, and other applications.

BRIEF DESCRIPTION OF THE DRAWINGS

Certain examples are described in the following detailed description and in reference to the drawings, in which.

DETAILED DESCRIPTION OF SPECIFIC EXAMPLES

Figure 1:
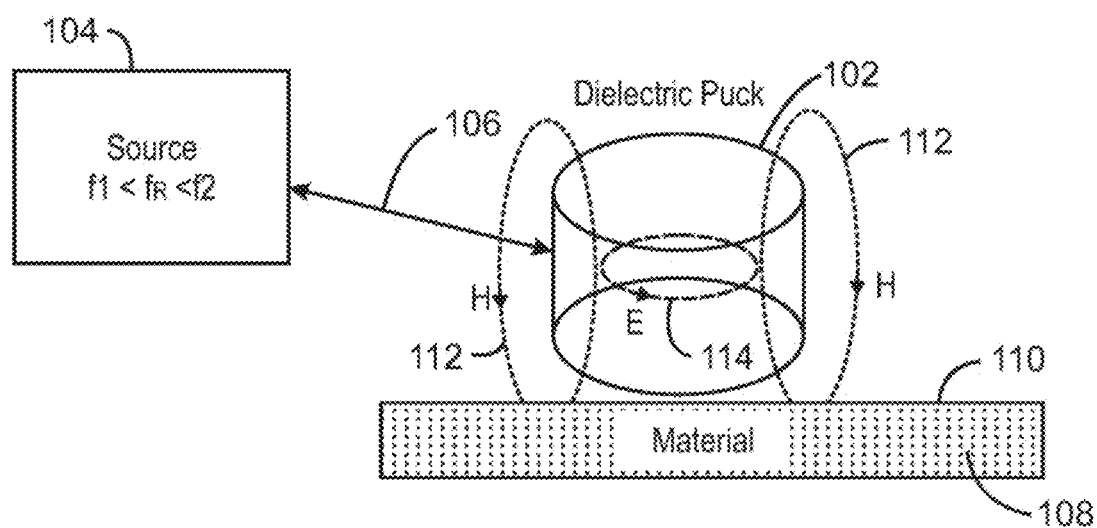
FIG. 1 is a diagram of a microwave sensing system for AM in accordance with examples.

A product or part fabricated in AM may have a defect or be out-of-specification. The defect or failed specification may not be discovered until after the product is formed or produced, such as during examination or testing of the finished product, or at the customer site, and so on. Such off-spec production may increase production costs. Further, customer perception may be adversely affected if the defective product is delivered to the customer.

An issue is that in-situ or real-time product testing during the 3D printing has not existed or has been inadequate. Thus, adverse production may not be understood or known till after the fact. Therefore, process or operational adjustments to prevent, reduce, or mitigate defects or properties out of specification have been unavailable or problematic. In contrast, as discussed below, examples herein may provide for in-situ and real-time sensing of AM product properties during manufacture. Therefore, in certain examples, adjustments can be made. Indeed, a control loop may be implemented, for instance.

In examples, AM may build and modify materials with "layer-by-layer" control as the bulk product may include an amalgamation of individual layers that have been "stitched" together at a molecular level via the introduction of thermal, radiative, and/or ionized beam energy. Control of the chemical composition, structure, stress, mechanical, and electrical properties of each layer may be applicable, depending on the AM process and product. The ability to monitor and assess particular features of the materials and process conditions associated with the build may be to layer-by-layer construction in the manufacturing. In other words, such monitoring and assessment may facilitate that the final product meets design guidelines and performance specifications. The promotion of product performance metrics during build may reduce off-spec or scrap production and also reduce post-part inspection. Hence, the overall cost of the manufacturing may be reduced. The present techniques may be beneficial for AM products generally including for high-end products such as automotive and aircraft parts, and so on. Examples may monitor process results layer-by-layer and in relation with process parameters and build-structure architecture.

In some examples, a localized microwave sensing apparatus may be employed to assess material properties associated with the the AM part or product being formed, e.g., formed via selective laser melting (SLM) or electron beam melting (EBM). The sensing apparatus may be based on the interaction or coupling of microwave-frequency electrical and/or magnetic energy emanating from a "source" resonator. In some examples, the resonator can be placed in a specific location within, on, or near a powder-build bed surface. That surface may consist, for example, of virgin or re-used powder or build material generally, or fused material, and so on. In one example, the surface is a SLM AM powder-build bed surface. The change in the resonant frequency of the resonator due to the interactions of the exposed electromagnetic fields with the powder or material being tested may be indicative of material quality or state. Indeed, this change in resonant frequency due to interaction of the electromagnetic fields with the material may serve as a sensing signal to differentiate material quality or state. In some examples, this determination may be relative to a control or calibration value.

Some of the material factors that can be identified include surface conductivity, layer density, part warpage, part defects, local composition, permittivity, powder bed defects, surface roughness, and so forth. The determinations can be in-situ and provide for feedback loop capability for compensation in some examples. The surface conductivity of the material being tested may be related to the magnitude of induced current in the material. The measurement or detection of surface conductivity or change in surface conductivity may be useful, for example, as an in-situ resistance measurement for continuity of print determinations, and the like. Further, variation in layer density may be detected or measured in the product part density or powder-bed density such as through the height (z-direction) or in a plane (x-y directions). Moreover, the determination of surface roughness may give direct feedback of surface quality without printing the entire part.

Examples include a microwave sensing system including at least a resonator and an associated energy device. Examples may provide for a system and method for AM including forming a product via AM, placing a resonator adjacent the product as the product is being formed in the AM, and determining a property (e.g., material property) of the product. The resonator may generally operate over a microwave frequency spectrum and emanate electromagnetic energy. The property may be determined as a function of the electromagnetic energy and/or as a function of the coupling of the electromagnetic energy with the build material or product. The property may be determined as a function of resonant frequency of the resonator and/or as a function of the change or shift in the resonant frequency. The resonant frequency may be affected by the interaction or coupling of the electromagnetic energy with the product or build material. The property may be determined as a function of the electrical current induced in the product. The current may be induced in the product by the coupling of the electromagnetic energy with the product. The property may be determined as a function of other factors, including factors related to or sensed by the microwave sensing system.

FIG. 1 is a microwave sensing system 100 for in-situ application in a 3D printer in AM. The AM may involve and the 3D printer may employ selective laser melting (SLM), electron beam melting (EBM), and/or other fabrication techniques. SLM may employ 3D model data (e.g., computer-aided design files or CAD files) or other digital data and a high-power laser beam to produce 3D parts (e.g., metal parts) by fusing fine powders (e.g., metal powders) together layer-by-layer. Similarly, selective laser sintering (SLS) may employ 3D model data or other digital data and a laser beam to produce 3D parts (e.g., plastic parts) by fusing fine powders (e.g., plastic powders) together layer-by-layer.

The EBM 3D printing technique typically utilizes 3D model data and an electron beam to weld (e.g., at up to 1000 C) metal powder or wire layer-by-layer to produce 3D parts. Full or substantially full melting of the metal powder may be achieved. The powder bed generates dense metal parts directly from metal powder with characteristics of the target material. The powder feedstock may be pre-alloyed in some examples. Other AM printing techniques may be employed.

The microwave sensing system 100 includes a resonator 102 (e.g., a dielectric puck) and a source device 104 (e.g., energy source device) to be operationally coupled to the resonator 102, as indicated by arrow 106. In one example, the source 104 may couple to the resonator 102 puck by capacitive coupling via a transmission line near the puck, and so forth. The sensing system 100 may operate the resonator 102 at microwave frequency such as in the ranges of 300 megahertz (MHz) to 300 gigahertz (GHz), 1 GHz to 100 GHz, 1 GHz to 40 GHz, 3 GHz to 30 GHz, 30 GHz to 300 GHz, and the like.

In one example, the resonator 102 is a dielectric puck resonator supporting at least two resident modes including a transverse (TE) mode and a transverse magnetic (TM) mode. For some examples with the resonator 102 as a dielectric puck, the puck may be generally cylindrical shape as depicted in the illustrated example.

The source 104 may supply energy to the resonator 102 over a frequency range or spectrum of $f_1$ to $f_2$, and with the resonant frequency $f_R$ of the resonator 102 in that frequency range. The source 104 or associated computing device may detect the resonant frequency of the resonator 102. Indeed, the source 104 or computing device may receive a signal from the resonator 102 indicative of the resonant frequency. The source 104 may have a microwave component. The frequency spectrum may be in the microwave range. Moreover, the source 104 may be or include an oscillator, a phase-shift oscillator, a network analyzer such as a vector network analyzer (VNA), and so on.

A network analyzer may measure both amplitude and phase properties. A network analyzer may involve a signal generator, a test set, one or more receivers and display. In some setups, these units are distinct instruments. A VNA may have two test ports and measure S-parameters.

In certain examples, the source 104 device is or includes a field-effect transistor (FET) oscillator. In some examples, the resonator 102 may include the source 104. For instance, an example of a resonator 102 may include both a source 104 oscillator and the dielectric puck. Thus, the resonator 102 may be, for example, a dielectric resonator oscillator (DRO). In other words, the resonator 102 may be an FET oscillator in conjunction with the dielectric puck. A variety of other types of sources 104 and associated measurement systems may be employed. Moreover, in some examples where the resonator 102 includes the source 104, the puck or similar component of the resonator 102 (not the entire resonator 102) may be placed adjacent the powder bed or product in the printer.

In operation, the resonator 102 or puck may be disposed or placed adjacent a material 108. The material 108 may be a product or object being formed in the AM or 3D printer. Thus, the material 108 may be, for example, a powder bed. In a particular example, the resonator 102 may be placed adjacent a surface 110 of the material 108, such as powder-build bed surface in the printer. The material 108 may be a product, part, or object being generated, produced, fabricated, or manufactured in the 3D printer. The material 108 may be build material, powder, or fused material, or any combination thereof.

In some examples, the resonator 102 may be moved or placed relative to the material 108 as the object is being built, such as via an arm, mechanical device, or other component of the printer. The movement or placement may be automatic or manual, and may be controlled by a computing device and in association with a 3D model of the object being built, and/or based on layer data for a current layer of the object or product being formed, and so on. Moreover, for larger objects and large surfaces of the object or product, the resonator 102 may be around including laterally over the object or surface.

The resonator 102 may emanate electromagnetic energy that interacts or couples with the material 108. The electromagnetic energy may generate or include a magnetic field H, as indicated by reference numeral 112. The resonator 102 may also generate or include an electric field E, as indicated by reference numeral 114. For an example cylindrical-puck resonator 102, the electric field E 114 may be in a plane of a circle of the resonator 102 as depicted. The magnetic field H 112 may in a plane parallel with the height of the resonator 102. The respective planes of the magnetic field H 112 and the electric field 114 may be perpendicular with respect to each other.

The emanating electromagnetic energy interacting or coupling with the material 108 may affect or shift the resonant frequency of the resonator 102. Thus, the sensing system 100 may detect, sense, or measure (or facilitate measuring) an attribute or a property of a material 108 in the 3D printer. Such may be in real time and a function of the resonant frequency or shift in the resonant frequency. The attribute may be a defect or a change. The property may be a material property, physical property, and so on. The sensing system 100 may detect, sense, or measure an attribute or a property of a surface of the material 108. The coupling of the electromagnetic energy with the material 108 may also induce an electrical current in the material. Thus, a property of the material 108 may be sensed as a function of the induced current.

The microwave sensing system 100 may couple to or include a computing device (not shown) to facilitate determining of an attribute or property of the material 108 as a function of the resonant frequency and/or other factors. The system 100 may determine an attribute or property of the material 108 as a function of the interaction of the electromagnetic energy with the product and/or an associated shift in the resonant frequency of the resonator.

In some examples, the resonator 102 as a dielectric puck may be characterized as a dielectric waveguide. Moreover, the puck may have high permittivity and low loss or low loss tangent to provide an efficient resonator 102 that can stimulate resonant modes within the dielectric material by application of the appropriate electrical bias. The stimulated resonator 102 or puck may support at least two resident modes, such as TE011 mode corresponding to exposed magnetic field energy and a TM011 mode corresponding to exposed electric field energy by the device. In this particular example, the TE011 mode of the resonator 102 may be used to expose or drive magnetic field 112 energy into the material 108 under test.

As energy is removed from the impingent magnetic field 112 due to coupling of that energy with the material 108 under test so as to create a localized induced current in the test material 108, the resonate or resonant frequency of the puck resonator 102 may shift to equalize distribution of the internal electric field 114 inside the resonator 102 and magnetic field 112. In some examples, this rebalancing may generate a signal that can be used as sensing or a sensor by a device such as the source 104 because the amount of energy removed may be a function of a state of the material 108 under test.

If the sensor encounters material in state A, the corresponding resonant frequency shift is A'; if the sensor encounters material in state B, the corresponding resonant frequency shift is B' and so on. By knowing the relationship between resonant frequency shifts and the state of the material, an in-situ sensor of this type can be used to assess the material in-situ and in real-time on, for example, a layer-by-layer basis.

With respect to voxel density and surface roughness, examples may combine the foregoing microwave sensing with devices to measure feature height, and with a baseline analysis (known conditions) of the powder, to facilitate real-time monitoring of powder density or consolidation and build-part density (by proxy), and the like. These may be beneficial parameters to monitor and analyze layer-by-layer to promote closed-loop process monitoring and control as well as real-time build part qualification, and so on.

Figure 2:
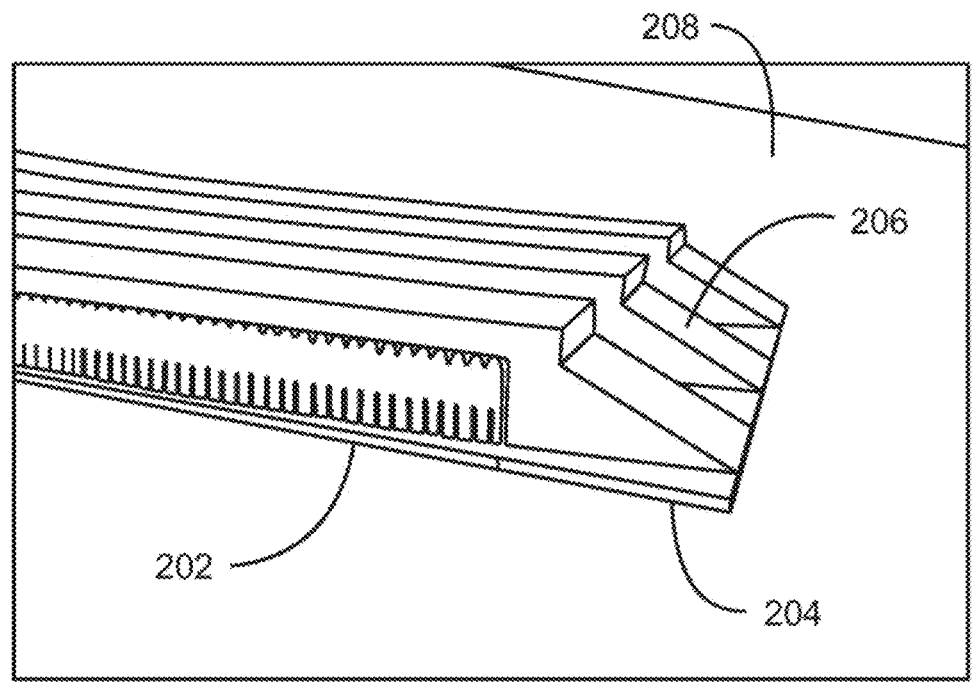
FIG. 2 is a diagram to discuss product warpage.

FIG. 2 is a diagram 200 of product warpage. With regard to sensing product or part warpage, detection of the object warpage may generally mean detection of a change in position of a spatial location on a part relative to an expected or baseline position. FIG. 2 notes two locations 202 and 204 on a level instrument 206 place on a surface 208. The deflection down of the instrument at the end location 204 relative to the location 202 indicates warpage of the surface 208. Thus, for an SLM part made from stainless steel, for example, and having the surface 208, the diagram 200 shows distortion of the part with location (middle of part versus the end). Examples of the microwave sensing device herein may detect the distortion either after the part is built or in real time during the AM process. Examples of this technique may also determine the amount of residual strain in a material during the process as strain may cause localized distortion.

Figure 3:
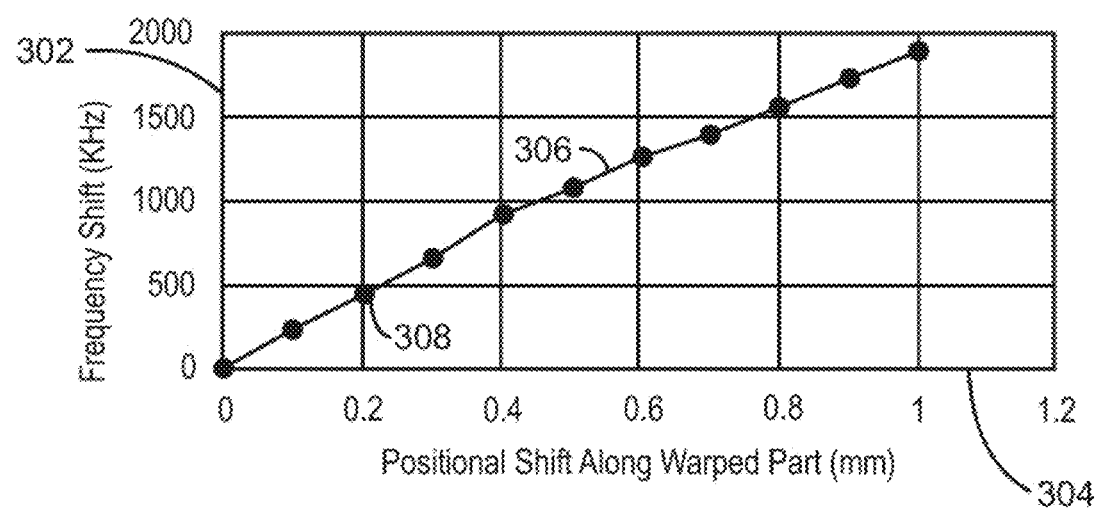
FIG. 3 is a plot of resonant frequency shift versus positional shift of the resonator along a warped product in accordance with examples.

FIG. 3 is a plot 300 of resonant frequency shift 302 in hertz (Hz) versus positional shift 304 of the resonator in millimeters (mm) along a warped part. The frequency shift is resonant frequency shift of a resonator placed adjacent the warped surface of the part. The plot 300 depicts a curve 306 drawn through data points 308. The resonator is a dielectric puck stimulated at microwave frequency. The plot 300 indicates a change or shift in resonant frequency of the resonator along the surface of the part. This may be due to the change in the interaction or coupling of the resonator magnetic field with the part along the surface of the part. A microwave sensing system for AM can detect that the part is warped by observing the shift in resonant frequency of the resonator. In this example, the part warps down away from the resonator along the positional shift. Therefore, in this example, the resonant frequency shift increases with increasing distance between the resonator and the surface of the part.

With regard, to surface defect detection, layer quality may generally be beneficial to successful AM manufacturing. The presence of defects in the powder either due to spreading or post-spreading perturbation of material can lead to direct defects in the printed parts. Examples of the present techniques may detect defects at the powder level by capturing the frequency shift in the microwave resonator when place over the defect area.

Figure 4:
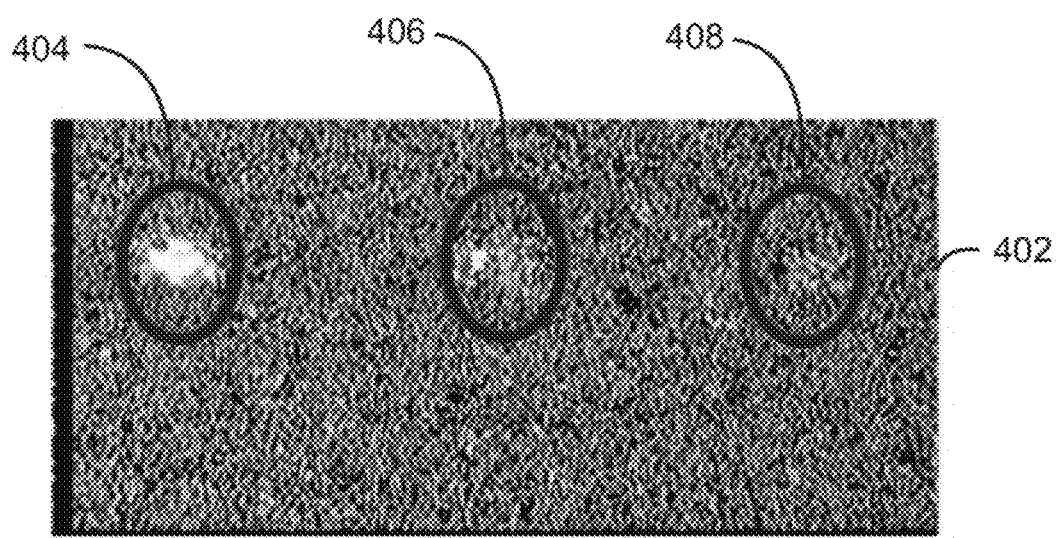
FIG. 4 is an image of a surface of a powder build material having three defects at different depths.

FIG. 4 is an image 400 of a surface 402 of a powder build material having three defects 404, 406, and 408 at three different depths, respectively. The defects are circled in the image 400. These three defects were intentionally introduced into a respective spread powder layer using a calibrated atomic force microscope (AFM) tip approximately 100 micrometer (μm) in size. Thus, the powder layer was disturbed to generate the defect.

As for microwave sensing, when placing a dielectric puck over a defect the resonant frequency of the dielectric puck shifted as compared to the resonant frequency of the puck over undisturbed powder. Example values of the resonant frequency over give below in Table 1. As shown, the resonant frequency shift is observed in the microwave sensing device. In this example, the change or shift in the resonant frequency of the dielectric puck is 17 megahertz (MHz).

TABLE 1

| Resonant Frequency |
| --- |
| Puck frequency over undisturbed powder = 16.137 gigahertz (GHz) |
| Puck frequency over surface detect = 16.154 GHz |
| Frequency shift due to surface defect = 0.017 GHz or 17 MHz |

Some examples of the sensing system provide for in-situ direct sensing of AM defects in parts or powder at a localized level. In certain examples, several different attributes of the AM part or powder can be sensed with one sensor and, therefore, insight into build success may be gained without complimentary instrumentation in some examples. In-situ microwave device sensing may provide for monitoring composition and physical attributes of powder materials and build parts at the voxel level. This type of monitoring may provide for characterization of parts and materials in real time and at the tool level. Such characterization may facilitate a manufacturer to understand build processes at the individual layer level. Indeed, components having graded properties tailored to a specific application can be characterized at the voxel level. Moreover, control loops may be implement to provide direct feedback to the build process in real-time. Not only may possible defects or part attributes be assessed in real time, the defects or out-of-specification attributes may be fixed, repaired, or mitigated in real time in some examples. AM metrology and sensing may be implemented.

Figure 5:
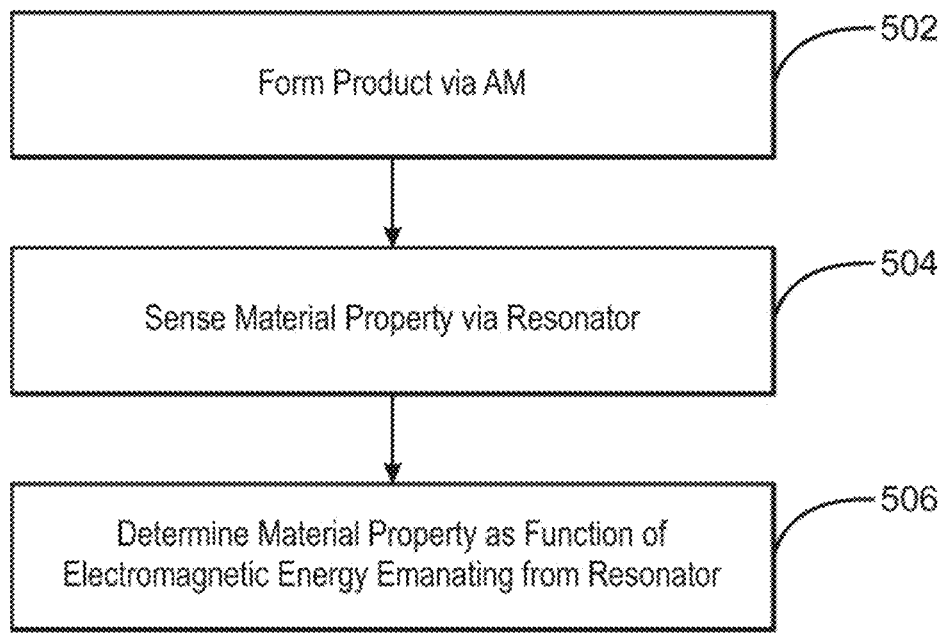
FIG. 5 is a method of AM including 3D printing in accordance with examples.

FIG. 5 is a method 500 of AM including 3D printing. At block 502, the method includes forming a product via AM. The AM may involve SLM, EBM, selective laser sintering (SLS), direct metal laser sintering (DMLS), fused deposition modeling (FDM), and/or other AM printing techniques. In a particular example, a layer of the powder or build material is applied to a bed or building platform. In this particular example, a laser beam fuses the powder at points specified by computer-generated component design data. The platform is then lowered and another layer of powder or build material applied. Once again, the material is fused so as to bond with the layer below at the predefined points. As discussed, printable materials may include plastics, resins, ceramics, cement, glass, numerous metals and metal alloys, and thermoplastic composites infused with carbon nanotubes and fibers, and so on. Fabricating an object layer-by-layer, according to a digital blueprint downloaded to a printer, may facilitate customization and design intricacy.

At block 504, the method includes sensing a material property of the product as the product is being formed. To do so, a resonator or dielectric puck may be placed in-situ adjacent the product. If the product is being formed in a 3D printer, the resonator or dielectric puck may be a component of the printer, and the resonator placed adjacent a product build surface in the printer, e.g., in-situ. The resonator may be stimulated by a source, and the resonator emanate electromagnetic energy that interacts or couples with the product or build material.

In the sensing, the resonator or puck may be stimulated and the resonant frequency indicated or detected. An indicated or detected change or shift in the resonant frequency may correlate with an attribute of the product, a change in the material property, a value of the material property, a product defect associated with the material property, or that the property has not satisfied a specification, and so on. The emanating electromagnetic energy interacting or coupling with the product may affect or shift the resonant frequency of the resonator. The coupling may be affected by the attribute or material property and by a change in the attribute or material property.

At block 506, the method includes determining the material property as a function of the electromagnetic energy emanating from the resonator, such as influenced by the coupling of the electromagnetic energy emanating from the resonator with the product. In other words, the method may determine the material property as a function of the resonant frequency of the resonator. Indeed, the coupling of the electromagnetic energy emanating from the resonator with the product may change or shift the resonant frequency which may be correlative with a property, attribute, and/or change in the product.

A source device or computing device may determine the material property, including in real time. This determining in the sensing of the material property may be determining an attribute, change, or defect. On the other hand, the determining in the sensing may determine a value of the material property, e.g., via a function or equation that correlates material property values with the resonant frequency of the resonator. Such correlations and determinations may be for a particular 3D printer, a particular product, and/or a particular product specification, and so on. The computing device or other device may perform the calculations or lookups. The computing device may supplement the sensing system or be a component of the sensing system. The computing device may be associated with a control system of the printer, and the like.

Figure 6:
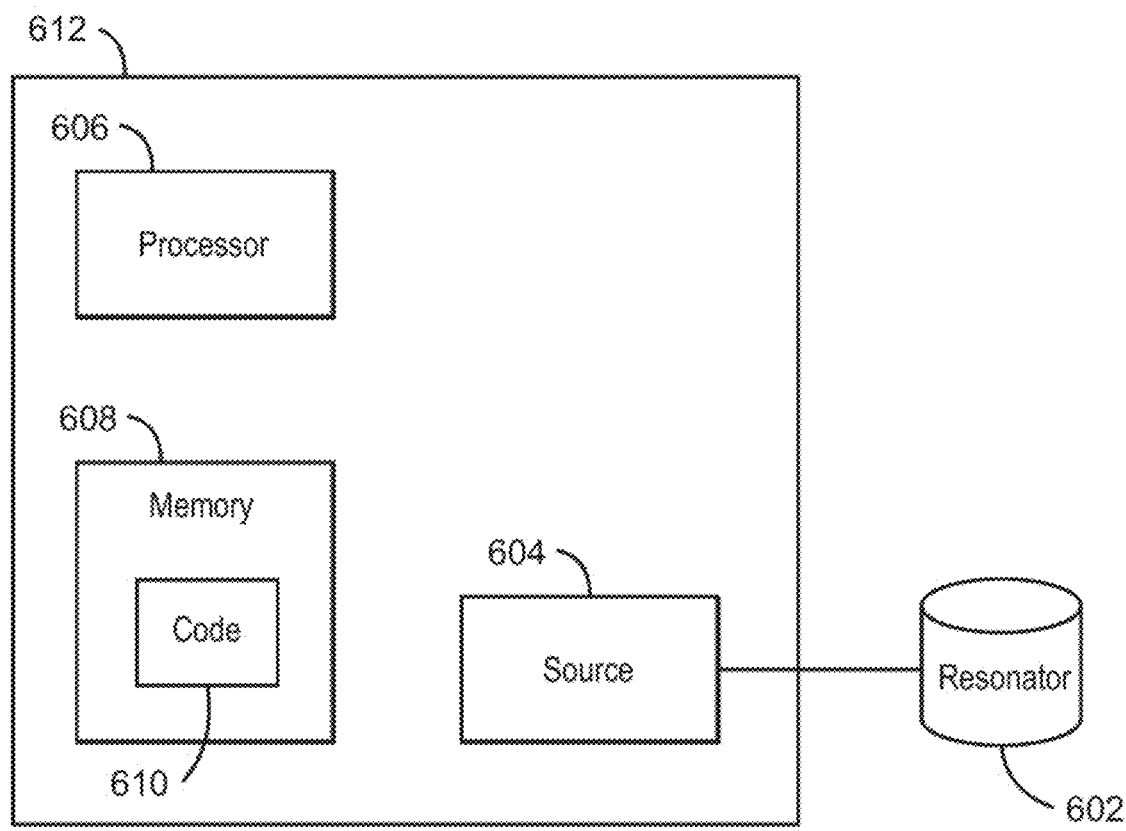
FIG. 6 is an AM microwave sensing system in accordance with examples.

FIG. 6 is an AM microwave sensing system 600 including a resonator 602 (e.g., a dielectric puck) and a source 604 (e.g., energy source device) to be operationally coupled (e.g., via capacitive coupling) with the resonator 602. The AM microwave sensing system 600 may be for in-situ application in a 3D printer. As discussed, the sensing may be of a product in the 3D printer, including in real time as the product is being formed. The forming product may intermediately be powder, powder bed, build material, build platform, fused material, and so on.

Thus, placement of the resonator 602 adjacent or near the forming product may be to place the resonator 602 adjacent or near the powder, powder bed, build material, build platform, and/or fused material, and so on. The resonator 602 can be placed adjacent the product, such as within 6 inches of the product without contacting the product. The resonator 602 may operate at further than 6 inches of the product, including for smaller or larger surfaces, or smaller or larger products. In alternate examples, the resonator 602 may come into contact with the product. In general, various limits for the sensing system 600 may be implemented.

The sensing system 600 may provide for the resonator 602 to operate at microwave frequency. Indeed, the resonator 602 may be the same or similar to the resonator 102 discussed above with respect to FIG. 1.

The source 604 may be a component of a computing device 612 as depicted, or may be separate from and coupled to the computing device 612. Moreover, in certain examples, the source 604 may be combined with the resonator 602. Some examples of the source 604 are the same or similar to the source 104 discussed above with respect to FIG. 1.

The source 604 may supply energy to the resonator 602 over a microwave frequency spectrum and with the resonant frequency of the resonator 604 in that frequency range. The source 604 or computing device 612 may detect the resonant frequency of the resonator 602. For example, the source 604 or the computing device 612 may receive a signal indicative of the resonant frequency. The source 604 may be or include an oscillator, phase-shift oscillator, FET oscillator, network analyzer, VNA, or other device to supply energy and detect resonant frequency.

As discussed, in operation, the resonator 602 may emanate electromagnetic energy that interacts or couples with the product. In particular, the resonator 602 may generate an internal electric field and may emanate a magnetic field that couples with the product. In particular example, the plane of the magnetic field is perpendicular to the plane of the electric field.

The emanating electromagnetic energy or magnetic field interacting or coupling with the product may change or shift the resonant frequency of the resonator 602. Thus, the sensing system 600 may detect, sense, or measure (or facilitate measuring) an attribute or a property of the forming product in the 3D printer. Such may be in real time and a function of the resonant frequency or of the shift in the resonant frequency. As discussed, the attribute or property may be a defect or change, a material property, a physical property, and so on, for the product including the surface of the product.

The removing of energy from the impingent magnetic field due to coupling of that energy with the product may generate a localized induced current in the product. Further, the resonant frequency of resonator 602 may shift to equalize distribution of emanating magnetic field and the internal electric field inside the resonator 602 and. In some examples, this rebalancing to account for some loss of the magnetic field due to coupling with the product may provide for indication the sensed attribute or property of the product.

The AM microwave sensing system 600 in the illustrated example of FIG. 6 includes the computing device 612 having a hardware processor 606 and memory 608. The processor 608 may be a microprocessor, a central processing unit or CPU, and so forth. The processor 608 may be multiple processors and/or each processor 608 may have multiple cores. The memory 608 may be non-volatile memory, volatile memory, and other types of memory. The nonvolatile memory may be a hard drive, read-only-memory or ROM, etc. The volatile memory may be random access memory or RAM, cache, etc.

In the illustrated example, the memory 608 stores code 610 (e.g., instructions, logic, etc.) executed by the processor 606 to facilitate implementation of the aforementioned techniques. In one example, the memory 608 stores correlations (e.g., equations) between resonant frequency and resonant frequency shift versus attributes and material properties of various products. The code 610 may be executed to direct the processor 606 and the computing device to calculate or otherwise determine an attribute or material property of a product being formed in a 3D printer. In some examples, the calculations or determination may be performed in real time with the manufacture of the product. Also, the computing device 612 may include an application-specific integrated circuit (ASIC) customized for the techniques described.

An example of a microwave sensing system for AM may include: a resonator to be placed adjacent a product being formed in AM, and the resonator to emanate electromagnetic energy to interact with the product, the resonator to operate over microwave frequency; and a source device to supply energy to the resonator and to facilitate determination of resonant frequency of the resonator as affected by the interaction of the electromagnetic energy with the product. The microwave sensing system may sense resonant frequency shift to determine a property of the product in real-time. The microwave sensing system may include a computing device to determine a material property of the product as a function of the resonant frequency, wherein the resonator is or includes a dielectric puck, wherein to be placed adjacent a product being formed includes to be placed adjacent a powder-build bed surface in a printer of the AM, wherein the surface is powder or fused material, or a combination thereof, and wherein the AM is SLM or EBM, or both. A computing device to determine a property of the product as a function of the interaction of the electromagnetic energy with the product and an associated shift in the resonant frequency of the resonator, and wherein the resonator is or includes a dielectric puck supporting at least two resident modes including a TE mode and a TM mode. Lastly, the computing device may include a processor and memory storing code executable by the processor to determine a material property of the product as a function of the resonant frequency. In some examples, the computing device may include the source device.

Figure 7:
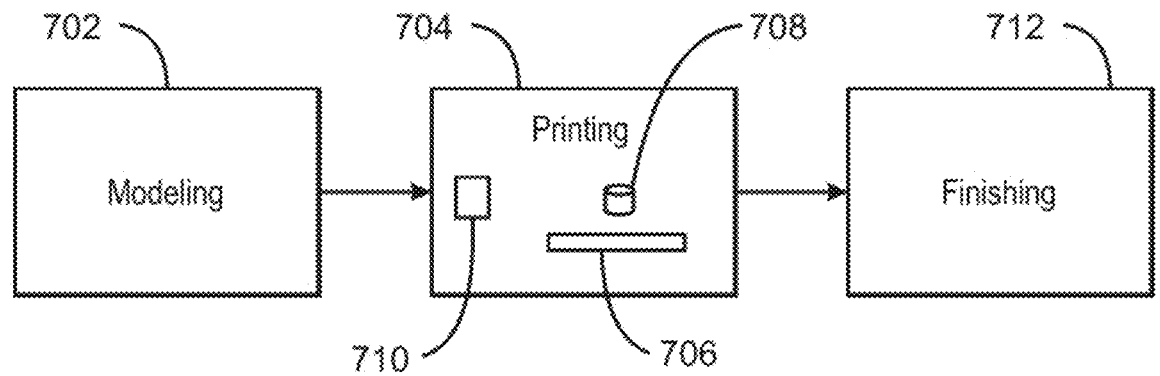
FIG. 7 is an AM system in accordance with examples.

FIG. 7 is an AM system 700 which includes a modeling system 702 and a printing system 704. The AM system 700 involves 3D printing performed by a materials printer using digital technology. As discussed, AM including 3D printing makes 3D solid objects from a digital model. The AM system 700 includes a modeling system 702 to receive a model, prepare a received model, or generate a model, and the like, for AM and 3D printing. The model may be a 3D model. The model may be "sliced" in preparation for the layer-by-layer printing. Digital data may be obtained from electronic data sources other than a model.

The model or other electronic source may provide digital 3D design data for the AM 3D printer in the printing system 704 to build a component or product in layers by depositing material. Such AM may be in contrast to milling a workpiece from solid block, for example. The AM 3D printer relying on the model may build the product layer-by-layer employing materials, for example, in powder form. A range of different metals, plastics, and composite materials may be used. Unlike subtractive manufacturing techniques that start with a solid block of material and then cut away the excess to create a finished part, AM may build a part (or features onto parts) layer-by-layer from geometry described in a 3D design model. Of course, subtractive manufacturing (e.g., subtractive machining) may be employed in conjunction with AM in certain examples.

The AM system 700 includes a printing system 704 having one or more 3D printers to print (fabricate) the product. Again, 3D printing or AM may make 3D solid objects from a digital file. An object is created by laying down successive layers of material until the object is created. Each of these layers can be seen as a thinly sliced horizontal cross-section of the eventual object. As mentioned, the 3D printing may involve SLM, EBM, SLS, DMLS, FDM, and/or other AM printing techniques. As indicated, 3D printing may be considered distinct from traditional machining and subtractive techniques which rely on the removal of material by drilling, cuffing, etc. As mentioned, there are different 3D printing technologies and materials but most employ a digital model to generate a solid three-dimensional physical object by adding material layer-by-layer. For example, FDM works on an additive principle by laying down material in layers, and in which a plastic filament or metal wire is unwound from a coil and supplies material to produce a part.

SLS uses a high-power laser to fuse small particles of plastic, metal, ceramic or glass powders into a mass that has the desired 3D shape. The laser may selectively fuse the powdered material by scanning the cross-sections (or layers) generated by the 3D modeling program on the surface of a powder bed. After each cross-section is scanned, the powder bed may be lowered by one layer thickness. Then a new layer of material is applied on top and the process is repeated until the object is completed. Thus, SLS may use a laser to melt and solidify layers of powdered material into finished objects.

These SLS printers may have two beds which may reside on pistons. When the printing process begins, a laser maps the first layer of the object in the powder, which selectively melts—or sinters—the material. Once a layer has been solidified, the print bed moves down slightly as the other bed containing the powder supply moves up; and a roller spreads a new layer of powder atop the object. This process is repeated, and the laser melts successive layers one by one until the desired object has been completed. Other examples and configurations are applicable.

SLM and EBM are generally metal 3D printing technologies. These techniques may create objects from thin layers of powdered material by selectively melting using a heat source. Due to the higher melting point of metals, SLM and EBM may employ significant power—a high power laser in the case of SLM or an electron beam for EBM. During the printing, the printer machine may distribute a layer of metal powder onto a build platform, which is melted by a laser (SLM) or an electron beam (EBM). The build platform is then lowered, coated with new layer of metal powder on top and the process is repeated until the object is fully formed. Both SLM and EBM may employ support structures, which may anchor the object and overhanging structures to the build platform and facilitate heat transfer away from the melted powder. In addition, SLM may take place in a low oxygen environment and EBM in vacuum, for instance, in order to reduce thermal stresses and prevent or reduce warping. Materials include various metals and alloys including steel, titanium, aluminum, cobalt-chrome, nickel, etc. Some examples of SLM and EBM have evolved to such that the prints are comparable to traditionally manufactured parts in terms of chemical composition, mechanical properties (static and fatigue), microstructure, and the like.

In FIG. 7, represented is a powder or build surface 706 of the product being formed in the printing system 704 or 3D printer. The printing system 704 or 3D printer may incorporate the above-discussed microwave sensing system including a resonator 708 and an energy source device 710. The energy source device 710 may be a component of our coupled to a computing device. The computing device may be a component of the 3D printer in certain examples.

The AM system 700 may include a finishing system 712. Though the printer-produced resolution may be sufficient for many applications, printing a slightly oversized version of the desired object in standard resolution and then removing material with a higher-resolution subtractive process can achieve greater precision in some examples. With some printable polymers, such as acrylonitrile butadiene styrene (ABS) and others, the surface finish may be smoothed and improved, for example, using chemical vapor processes based on acetone or similar solvents. Moreover, some printing techniques employ internal supports which may be mechanically removed or dissolved in the finishing system 712. For 3D printers for metal, finishing may involve cutting a metal component or product off a metal substrate after deposition.

The finishing system 712 may involve support removal, as well as sanding, vapor smoothing, painting, electroplating, and metal-machining finishes to meet the requirements of surface quality and geometry. Indeed, following removal of any support structures to separate the parts from the build platform, the products can be milled, drilled, polished, etc. Internal surfaces, such as those in internal/tempering channels for example, can be polished using abrasive flow machining. Heat treatment and/or shot peening may be applied, for example to improve the mechanical and tactile properties of the surface of AM product parts. While 3D printed products may in some instances not have as desirable a finish as that compared to, for example, molding, there are actions that can be taken in example finishing systems 712 to give that 3D printed object the look and even feel of an object that has been produced through techniques other than AM. These actions can be sanding to electroplating, and so forth.

Figure 8:
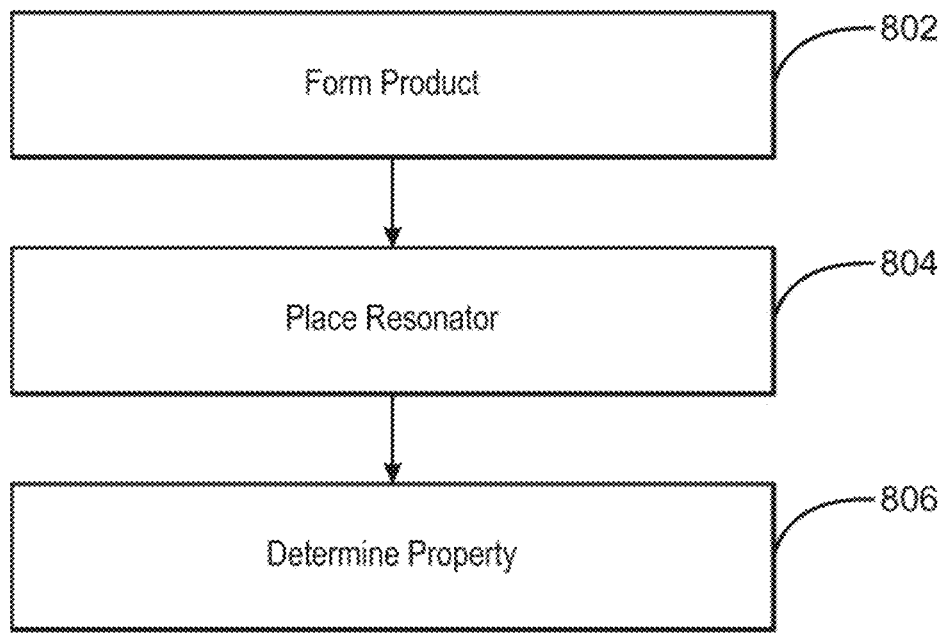
FIG. 8 is a method of AM including 3D printing in accordance with examples.

FIG. 8 is a method 800 of AM or 3D printing, including employing a microwave sensing system to in-situ test a product being formed. At block 802, the method includes forming a product in the AM process or 3D printer, such as via SLM, EBM, SLS, DMLS, FDM, and/or other AM printing techniques.

At block 804, the method includes placing a resonator adjacent the product as the product is being formed in the AM, the resonator operating over a microwave frequency spectrum and emanating electromagnetic energy. Placing the resonator adjacent the product may comprise placing the resonator adjacent a powder-build bed surface in a 3D printer, and wherein the surface is build material that is powder or fused material, or a combination thereof.

The emanating of electromagnetic energy from the resonator may include exposing magnetic field energy from the resonator to the product via a TE mode. The resonator may be a dielectric puck supporting at least two resident modes including the TE mode and a TM mode.

The coupling of the electromagnetic energy with the product changes the resonant frequency of the resonator. In other words, the electromagnetic energy impinges on the product resulting in the coupling of the electromagnetic energy with the product. This coupling removes energy from the resonator. The resonator balances this energy removal resulting in a change in the resonant frequency of the resonator. Indeed, the resonant frequency of the resonator may shift to equalize electric and magnetic field distributions of the resonator in response to the coupling of the electromagnetic energy with the product. The equalizing may include rebalancing indicative of resonant frequency shift and an amount of energy removed from the resonator via the coupling.

At block 806, the method determines a property (e.g., attribute, defect, material property, physical property, chemical property, mechanical property, etc.) of the product as a function of the resonant frequency of the resonator. A change or value may be determined such as inferred, detected, correlated, or calculated. Moreover, the electromagnetic energy from the resonator may include electromagnetic fields, and wherein determining the property as a function of the resonant frequency includes may include determining the property based on change in resonant frequency of the resonator due to the coupling of the product with the electromagnetic fields emanating from the resonator.

The property may be determined as a function of or based on a change or shift in the resonant frequency. The determining of the property (e.g., material property) may include determining a defect of the product, determining an attribute of the product, or determining a value of the property, determining a change in the property along a distance of the product, or any combinations thereof. The distance may be a height, a length, a width, a layer, a surface, or a depth of the product, or any combinations thereof. Further, the placement of the resonator and the determining of the property may be sensing the material property on multiple layers of the product. Moreover, determining the property may be relative to a control value.

Figure 8A:
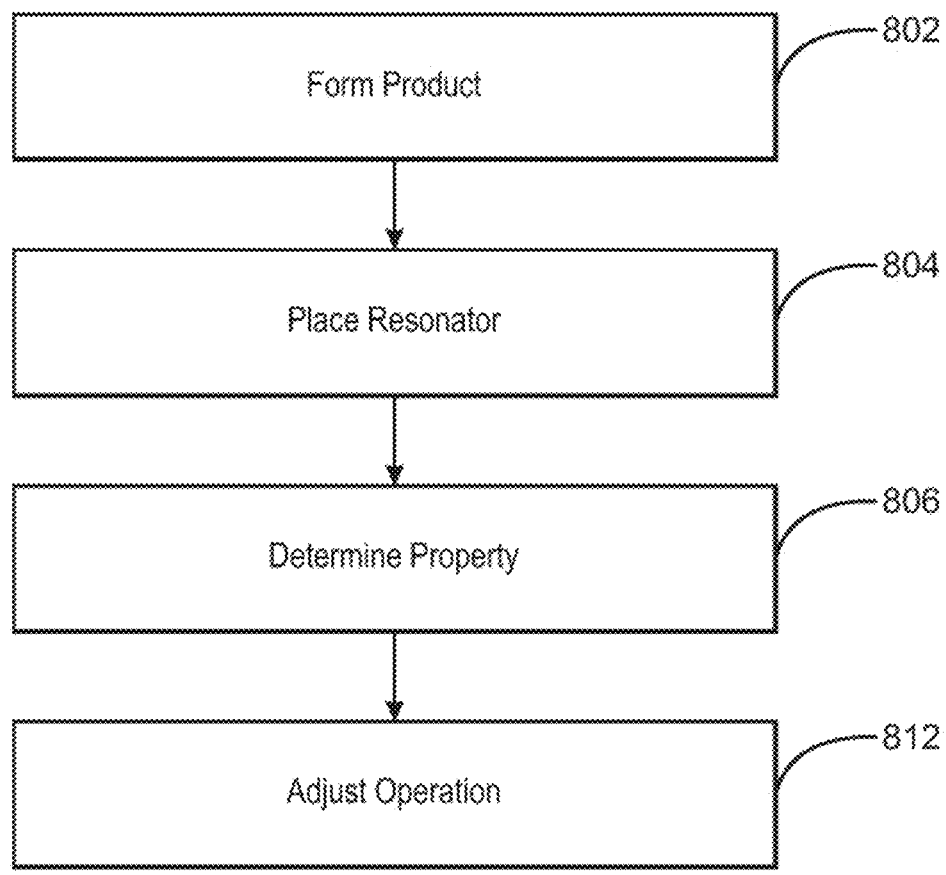
FIG. 8A is a method of AM including 3D printing in accordance with examples.

FIG. 8A is a method 810 of additive manufacturing including the method 800 of FIG. 8, and with the additional action of at block 812 of adjusting an operating condition of the AM in response to determining the material property. Indeed, a control loop may be implemented with respect to the 3D printer, for example. For instance, if a defect of the forming product is determined or an out-of-specification value for a property of the product is determined, an operating condition of the 3D may be altered to remove or mitigate the defect, to bring the product back into specification, and so forth.

Another example method of additive manufacturing is forming a product via the AM, sensing, via microwave frequency and a resonator, a material property of the product as the product is being formed in the AM, and determining a material property as a function of electromagnetic energy emanating from the resonator (and coupling with the product or build material). The method may include placing the resonator adjacent a powder-build bed surface in the AM, wherein the surface comprises powder or fused material, or a combination thereof. The determining of the material property as a function of electromagnetic energy may involve determining the material property based on change in resonant frequency of the resonator due to interaction between the product and electromagnetic fields emanating from the resonator.

Figure 9:
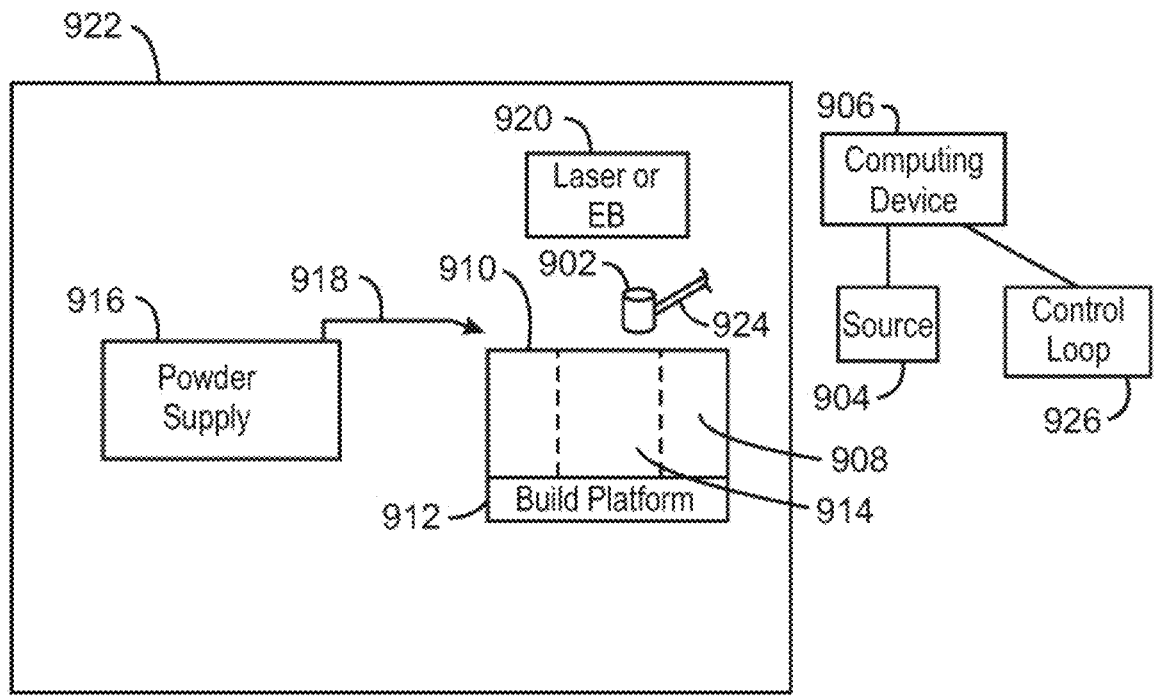
FIG. 9 is an AM 3D printer in accordance with examples.

FIG. 9 is a representation of an example 3D printer 900 and with only a small number of the printer components depicted for clarity. The printer 900 includes the aforementioned microwave sensing system which includes at least a resonator 902. The resonator 902 may be the same or similar as the resonator discussed above with respect to the preceding figures. The sensing system or resonator includes a source device 904 (e.g., an energy source) as also discussed above with respect to the preceding figures.

In some examples, the energy source 904 may be coupled to a computing device 906 or a component of the computing device 906. The computing device 906 may a part of the microwave sensing system. The computing device 906 or other computing device may be a component of the printer 900 and provide for control of the printer 900 including to receive and apply the 3D model for the layer-by-layer formation of the product 914.

In the illustrated example, the printer 900 in operation includes a powder bed 908 having a powder-bed surface 910. The example printer 900 may include a working platform or build platform 912 on which the powder bed 908 is to reside. The product 914 may be formed (printed) in the powder bed 908 and via digital data from a 3D model or other electronic source. In some examples, the build platform 912 may be disposed on piston (not shown) that, for instance, moves down as the product is being formed to facilitate the computer-controlled layer-by-layer fabrication.

The printer 900 may have a supply system 916 that can be filled with powder so that the supply system 916 can deliver 918 powder to the powder bed 908 in operation of the printer 900. The powder may be plastic powder or metal powder (e.g., stainless steel, etc.), or other powder materials. In a particular example, the supply system 916 may have a piston (not shown) that moves powder up as the other piston under the build platform moves down.

The printer 900 may include an energy or heating source such as beam generator 920 to apply, for example, a laser or electron beam to the powder bed 908 (e.g., at points on the powder-bed surface 910) to fuse the powder in the forming of the product. The positioning of the beam toward the surface 910 during operation may be directed by the digital model and control system, for example. The printer 900 may also include an enclosure or housing 922.

Further, the printer 900 may include an arm 924 or other positioning device to move the resonator 902 adjacent and over the powder bed 908. In operation, the arm 924 may place the resonator 902 within six inches of the product build surface 910 in certain examples. Further, in examples, the arm 924 may move the resonator 902 laterally across the surface 910. The arm 924 or other positioning device may place the resonator 924 adjacent a portion an object or the surface 910, and/or the resonator scanned over the object, layer, or surface 910.

As for control, the arm 924 or other resonator positioning device may be controlled automatically (e.g., via the printer 900 or computing device) or controlled manually, or both, depending on the implementation. In some examples, the arm 924 may be a robot arm. Moreover, the arm 924 may be a dedicated component of the microwave sensing system. On the other hand, the arm 924 may be a component of the printer 900. In certain examples, the arm 924 may be used in addition for a printer 900 function other than the microwave sensing.

The microwave sensing system including the resonator 902 may employed to detect a general defect of the product or object based on a change in resonant frequency of the resonator 902. The particular material property may or may not be known. On the other hand, a material property or value of the material property may be determined, and such could, for example, Indicate a defect or that the product may be out-of-specification without correction.

In certain examples, the printer 900 and associated microwave sensing system may build a material property map of the object or product as the object or property is being built by the printer 900. The map could be storing of data in memory of the printer 900 or computing device and used, for example to later certify that an object or product was correctly built or within specification, and that the printer 900 operated with acceptable operating limits, and so on.

Furthermore, the printer 900 system may include a control loop 926 to provide for adjustment of the operation of the printer 900 in response to feedback from the microwave sensing system including the resonator 902. Lastly, it should be emphasized that many other configurations of a 3D printer than that depicted in FIG. 9 may have or employ the microwave sensing system described herein.

An example of a printer for 3D printing in AM may include a resonator to be place adjacent a product being formed in the printer, wherein the resonator to operate over microwave frequency and emanate electromagnetic energy to interact with the product, a source device to supply energy to the resonator and detect resonant frequency of the resonator as affected by the interaction of the electromagnetic energy with the product, and a computing device to determine a material property of the product as a function of the resonant frequency. In some examples, the printer may include a control loop to adjust an operating condition of the printer in response to the determined material property, wherein to determine the material property may include to determine a defect of the product, an attribute of the product, a value of the material property, or a change in value of the material property over time or along a distance of the product, or any combinations thereof.

While the present techniques may be susceptible to various modifications and alternative forms, the examples discussed above have been shown by way of example. It is to be understood that the technique is not intended to be limited to the particular examples disclosed herein. Indeed, the present techniques include all alternatives, modifications, and equivalents falling within the true spirit and scope of the appended claims.

What is claimed is:

1. A method of additive manufacturing, comprising:
   forming a product via additive manufacturing (AM);
   placing a resonator adjacent the product as the product is being formed in the AM, the resonator operating over a microwave frequency spectrum and emanating electromagnetic energy; and
   determining a material property of the product as a function of resonant frequency of the resonator.

2. The method of claim 1, wherein placing the resonator comprises placing the resonator adjacent a portion of the product, wherein coupling of the electromagnetic energy with the product changes the resonant frequency, wherein determining the material property as a function of resonant frequency comprises determining the material property based on a shift in the resonant frequency.

3. The method of claim 1, wherein the electromagnetic energy comprises electromagnetic fields, wherein determining the material property as a function of the resonant frequency comprises determining the material property based on change in resonant frequency of the resonator due to the coupling of the product with the electromagnetic fields emanating from the resonator.

4. The method of claim 1, wherein resonant frequency of the resonator shifts to equalize electric and magnetic field distributions of the resonator in response to the coupling of the electromagnetic energy with the product, wherein the equalizing comprises rebalancing indicative of resonant frequency shift and an amount of energy removed from the resonator via the coupling.

5. The method of claim 1, wherein placing the resonator comprises placing the resonator within six inches of the product, wherein emanating electromagnetic energy comprises exposing magnetic field energy from the resonator to the product via a transverse electric (TE) mode, and wherein the resonator comprises a dielectric puck supporting at least two resident modes comprising the TE mode and a transverse magnetic (TM) mode.

6. The method of claim 1, wherein determining the material property comprises detecting a defect of the product based on a change in resonant frequency of the resonator, wherein the AM comprises three-dimensional (3D) printing, wherein placing the resonator adjacent the product comprises placing the resonator adjacent a powder-build bed surface in a 3D printer, and wherein the surface comprises build material comprising powder or fused material, or a combination thereof.

7. The method of claim 1, comprising adjusting an operating condition of the AM in response to determining the material property, wherein determining the material property comprises determining a defect of the product, or determining an attribute of the product, or determining a value of the material property, or determining a change in the material property along a distance of the product, or any combinations thereof, and wherein the distance comprises a height, a length, a width, a layer, a surface, a depth, or any combinations thereof.

8. The method of claim 1, wherein forming the product via AM comprises performing selective laser melting (SLM) in the AM or electron beam melting (EBM) in the AM, or both, to form the product, wherein the placing and the determining comprise sensing the material property on multiple layers of the product, and wherein determining the material property is relative to a control value.

9. A microwave sensing system for additive manufacturing (AM), comprising:
   a resonator to be placed adjacent a product being formed in AM and to emanate electromagnetic energy to interact with the product, the resonator to operate over microwave frequency; and
   a source device to supply energy to the resonator and to facilitate determination of resonant frequency of the resonator as affected by the interaction of the electromagnetic energy with the product.

10. The microwave sensing system of claim 9, wherein the microwave sensing system to sense resonant frequency shift to determine a property of the product in real-time.

11. The microwave sensing system of claim 9, comprising a computing device to determine a material property of the product as a function of the resonant frequency, wherein the resonator comprises a dielectric puck, wherein to be placed adjacent a product being formed comprises to be placed adjacent a powder-build bed surface in a printer of the AM, wherein the surface comprises powder or fused material, or a combination thereof, and wherein the AM comprises selective laser melting (SLM) or electron beam melting (EBM), or both.

12. The microwave sensing system of claim 9, comprising a computing device to determine a property of the product as a function of the interaction of the electromagnetic energy with the product and an associated shift in the resonant frequency of the resonator, and wherein the resonator comprises a dielectric puck supporting at least two resident modes comprising a transverse (TE) mode and a transverse magnetic (TM) mode.

13. The microwave sensing system of claim 9, comprising a computing device comprising a processor and memory storing code executable by the processor to determine a material property of the product as a function of the resonant frequency, and wherein the computing device comprises the source device.

14. A printer for three-dimensional (3D) printing in additive manufacturing (AM), comprising:
   a resonator to be place adjacent a product being formed in the printer, wherein the resonator to operate over microwave frequency and emanate electromagnetic energy to interact with the product;
   a source device to supply energy to the resonator and detect resonant frequency of the resonator as affected by the interaction of the electromagnetic energy with the product; and
   a computing device to determine a material property of the product as a function of the resonant frequency.

15. The printer of claim 14, comprising a control loop to adjust an operating condition of the printer in response to the determined material property, wherein to determine the material property comprises to determine a defect of the product, or an attribute of the product, or a value of the material property, or a change in value of the material property over time or along a distance of the product, or any combinations thereof.

* * * * *